United States Patent [19]

Booth et al.

[11] 4,000,653
[45] Jan. 4, 1977

[54] TROLLING APPARATUS

[75] Inventors: William M. Booth, Grand Haven; James E. Rieth, Grand Rapids, both of Mich.

[73] Assignee: James E. Reith, Grand Rapids, Mich.

[22] Filed: Oct. 20, 1975

[21] Appl. No.: 623,732

Related U.S. Application Data

[63] Continuation-in-part of Ser. No. 274,505, July 24, 1972, Pat. No. 3,916,555.

[52] U.S. Cl. .............................. 73/343 R; 242/106
[51] Int. Cl.$^2$ ............................................ G01K 7/00
[58] Field of Search ............ 73/170 A, 344, 343 R; 242/106, 86.5 R; 43/4, 43.12, 27.4

[56] References Cited

UNITED STATES PATENTS

| | | | |
|---|---|---|---|
| 2,741,126 | 4/1956 | Anderson et al. | 73/344 |
| 3,031,788 | 5/1962 | Shannon | 43/4 |
| 3,501,953 | 3/1970 | Cudlitz et al. | 73/170 A |
| 3,628,274 | 12/1971 | Wojahn | 43/43.12 |
| 3,721,124 | 3/1973 | Franks | 73/344 |
| 3,785,079 | 1/1974 | Rohn | 242/106 X |
| 3,916,555 | 11/1975 | Booth et al. | 242/106 X |

*Primary Examiner*—Donald O. Woodiel
*Attorney, Agent, or Firm*—Price, Heneveld, Huizenga & Cooper

[57] ABSTRACT

A trolling reel for raising and lowering a weighted control line to which a fishing line is detachably secured includes an electrically operated drive motor coupled to the reel for positioning the control line at a desired depth and securely holding the line when the motor is not actuated. The trolling apparatus is directly or remotely controlled and includes means indicating the length of control line extended. In one embodiment, control means are provided for fully raising the line by momentarily actuating a switch. In another embodiment, the control line is fabricated from a two-conducter electrical cable with a thermistor coupled to an end of the line which is extended at an angle from the lowered line by a spool to position the thermistor in proximity to the fishing lure. A remote temperature reading instrument is coupled to the control line through a slip ring assembly positioned on the reel and reel frame.

12 Claims, 23 Drawing Figures

TROLLING APPARATUS

CROSS REFERENCE TO RELATED APPLICATION

This application is a continuation-in-part of application Ser. No. 274 505, filed July 24, 1972 now U.S. Pat. No. 3,916,555

BACKGROUND OF THE INVENTION

The present invention relates to improved trolling apparatus and particularly to drive and control means therefor, and combined trolling apparatus including temperature sensing means.

When trolling in relatively deep water, it is desirable to use a control line with a heavy weight to hold the end of the control line at the desired depth. A fishing line is coupled to the control line in a detachable manner to maintain the fishing lure at the desired depth while trolling and provide normal play of the fishing line once a fish strikes and the fishing line separates from the control line. Presently, trolling reels are manually operated to raise and lower the control line. One such apparatus is described in U.S. Pat. No. 3,614,016 issued on Oct. 19, 1971 and assigned to the present assignee. Since it is necessary to raise and lower the control line to recouple the fishing line after each strike, and since the weighted control line is frequently payed out to lengths in excess of 100 feet; the operation of the manual reels can become quite burdensome.

Although power driven fishing reels for paying out and retrieving fishing lines are known, such systems are generally unsuitable for trolling reels since the design considerations for the two different reels are dissimilar. In addition to providing a powered deep water trolling reel, it is desirable to provide depth indication means at the reel, at a remote location such as the boat's pilot house; or at both locations. It is also frequently desirable to remotely control the trolling reel drive and to have it retrieve the line automatically after a strike so the fisherman can concentrate on landing the fish and quickly reattach the fishing line. These features have not been provided by existing trolling apparatus.

Since many species of fish prefer known temperature waters, it is generally desirable to pay out the control line to water depth at which such temperature strata exists thereby positioning the lure or bait within the area habitated by the species of fish sought. The water temperture and depth can be ascertained by a separate line lowered a measurable distance to the desired temperature strata by positioning a temperature sensitive measuring device on the line. The trolling control line is then payed out the same length.

The use of an electrical cable with a temperature sensitive device positioned at one end for the control line is suggested in U.S. Pat. No. 3,628,274 to Charles P. Wojahn issued on Dec. 21, 1971. The device described in this patent, however, does not provide remote reading of the detected temperature but mounts the electrical components and indicators directly on the manually operated rotating reel. With such an arrangement, the reel must be stopped to read the water temperature and the operator must view the indicator from the side of the reel which can be very inconvenient. Additionally, the temperature sensing element of the system described in this patent is positioned adjacent the weight at the end of the control line. Frequently, the fishing lure is actually several feet above, below, or away from the end of the control line thus an erroneous reading can occur. In one embodiment of the present invention whereupon the control line provides electrical conductors to a temperature sensing means, means are provided for positioning the temperature sensing means in proximity to the fishing lure to provide an accurate indication of the water temperature at which the lure is located.

SUMMARY OF THE INVENTION

The existent need for a powered deep water trolling reel which can be remotely operated and which provides depth and/or temperature information is met by the unique apparatus of this invention.

The novel concepts of this invention include a motor driven trolling reel which is reversible and can be controlled for paying out and retrieving a control line with self-braking to securely position the line at any desired depth. The apparatus can be remotely operated and one embodiment includes an automatic control for retrieving the line upon the actuation of a push button switch. Indicating means are provided for directly or remotely displaying the depth of the weighted control line as it is payed out or retrieved. Still further aspects of the novel concepts embodying this invention include an electrical cable employed as a control line and having a temperature sensitive element electrically coupled at one end. Means are provided for positioning the temperature sensing element in proximity with the fishing lure employed in conjunction with the trolling control line to provide accurate temperature measurements. The opposite end of the electrical conductors of the cable are coupled to an easily readable remote temperature indication means.

Apparatus embodying the present invention includes a support frame for rotatably supporting therein a line reel having a shaft extending therefrom and coupled to a reversible motor by gear means. A control line wound on the reel is fixedly attached to the reel at one end thereof and extends through guide means positioned on an arm extending from the support frame. Control means are provided for selectively actuating the motor to position and hold the weighted control line at a desired depth. In some embodiments, additional control means are provided for actuating the motor in one direction to fully retrieve the control line. In other embodiments, remote control and indicating means are provided for controlling the motor and providing an indication of the depth of the control line at a location remote from the position of the line reel. In still further embodiments, the control line comprises a dual conductor electrical cable having a temperature sensitive element coupled at one end and remote temperature sensing means coupled to the opposite end of the control conductor through coupling means on the support frame and reel.

It is an object, therefore, of the present invention to provide an improved trolling reel having a reversible motor drive.

An additional object of the present invention is to provide a powered trolling reel with remote control and indicating means for the operation and use thereof.

Another object of the present invention is to provide a motorized trolling reel with means for controlling the motor to fully retrieve the reel automatically upon the momentary actuation of a switch.

Still a further object of the present invention is to provide a trolling reel with an electrical cable having temperature sensing means coupled at one end thereof and temperature indicating means coupled to an opposite end thereof through coupling means positioned on the reel and reel frame, whereby the indicating means can be positioned remote from the reel.

A further object of the present invention is to provide a trolling reel and cable including temperature sensing means, and means for suspending the temperature sensing means in proximity to a fishing lure detachably coupled to the control line of the troller.

These and other objects of the present invention will become apparent upon reading the following description thereof together with the accompanying drawings in which:

DETAILED DESCRIPTION OF THE PREFERRED EMBODIMENT

Figures 3, 4:
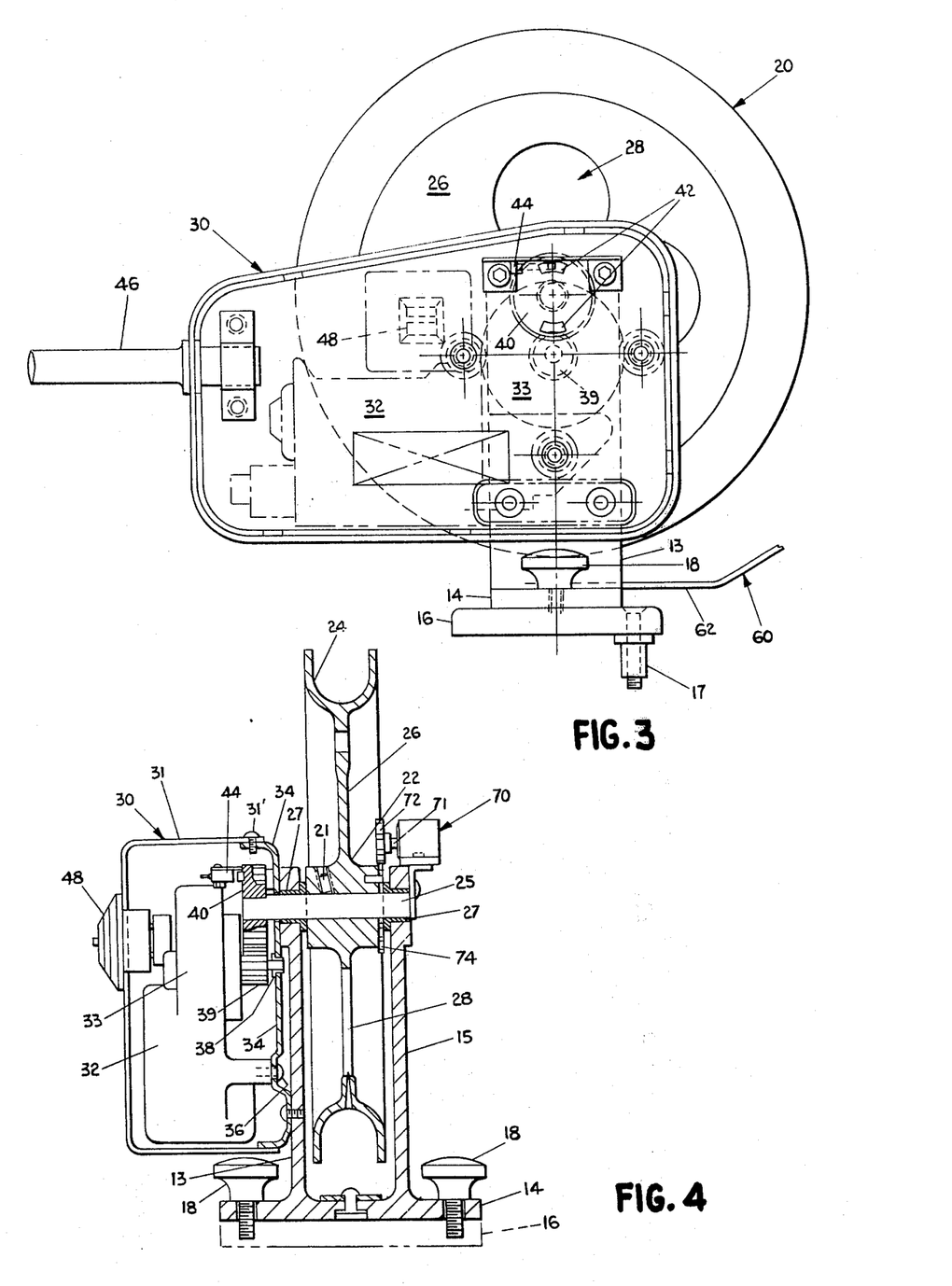
FIG. 3 is a partial right side elevation of the trolling apparatus shown in FIG. 2.
FIG. 4 is a cross-sectional view of the trolling apparatus taken along the lines IV—IV in FIG. 2.

Referring now to FIGS. 1 through 4, there is shown a reel assembly 10 including a frame 12 to which is rotatably mounted a line reel 20 and a reel drive unit 30. The frame 12 includes a base 14 to which is integrally formed a pair of spaced vertically extending arms 13 and 15. The base 14 is adapted to be removably secured to a deck plate 16 by means of a pair of threaded bolts 18. The deck plate 16 is secured to the transom or gunwale of the boat by means of lugs 17 (FIG. 3). This mounting arrangement permits easy removal of the reel assembly when not in use.

The reel 20 comprises a central spindle 22 which is secured to a reel shaft 25 by means of suitable set screws 21 as seen in FIG. 4. Shaft 25 is rotatably supported between arms 13 and 15 by means of a pair of bushings 27 (FIG. 4) fitted into the arms near the top. Shaft 25 extends at one end into the reel drive unit to be rotatably driven thereby as described below. The reel 20 is of cast aluminum having a circumference of approximately two feet with a channelled perimeter 24 for holding the control line 50 therein. The web 26 extending between the spindle and channel of the reel includes a plurality of spaced apertures 28 which serves both to reduce the material cost of the reel and, as described in detail below, provides means for coupling the line 50 (when an electrical conductor) to the frame of the reel assembly.

Figure 1:
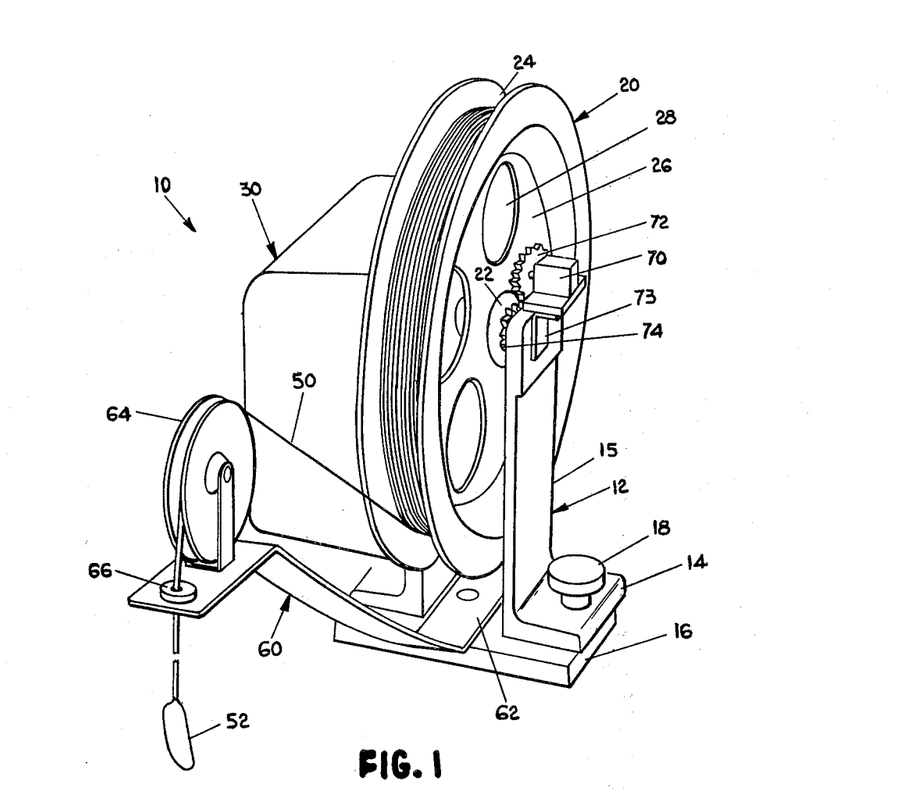
FIG. 1 is a perspective view of one embodiment of the present invention.
Figure 2:
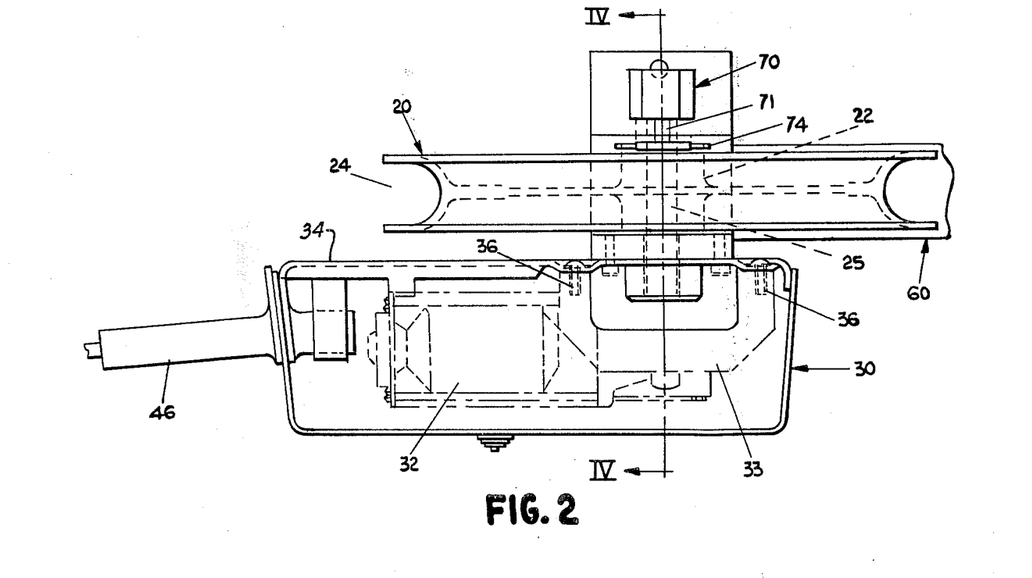
FIG. 2 is a partial plan view of the trolling apparatus shown in FIG. 1.

The reel assembly includes a flexible action arm 60 secured at one end 62 to the base 14 of frame 12 and extending outwardly and upwardly therefrom supporting a guide wheel 64 at the opposite end thereof and a guide bushing 66 as seen in FIG. 1. The control line 50 is anchored at one end to the reel 20 and extends from the reel over the guide wheel 64 and through the guide bushing 66 where it is positioned over the edge of the boat for lowering into the water. The free end of line 50 includes a clip 52 for connecting the line to a releasable clip (not shown) to releasably hold a fishing line. As will be described in conjunction with FIGS. 21 and 22 below, angle forming means including weight attaching means may be attached to line 50 and spaced from clip 52.

The reel assembly 10 further includes a revolution counter 70 which is calibrated to indicate the length of line payed out. Counter 70 has a shaft 71 (FIGS. 2 and 4) which is geared to shaft 25 of the reel by means of a counter gear 72 on shaft 71 engaged by a counter drive gear 74 secured to shaft 25. A suitable bracket 73 mounts counter 70 to arm 15. Attached to frame arm 13 is the reel drive unit 30 which provides powered drive for the reel 20 and self-braking such that once the line has been payed out or retrieved a desired length, the drive is deactivated and secures the reel without requiring separate reel braking means.

The reel drive unit 30 includes an electric motor 32 and a right angle 33 sealed in an integral housing which is secured to a mounting plate 34 by means of suitable bolts 36. Mounting plate 34 is in turn bolted to frame arm 13 by a plurality of bolts 35. A cover 31 is positioned over the motor and attached to plate 34 by screws 31'. Shaft 38 extending from the right angle drive 33 is rotatably supported at one end to the mounting plate 34 by means of a bushing 37 (FIG. 4). Fixedly positioned to the shaft 38 of motor 32 is a drive gear 39 which engages a follower gear 40 fixedly positioned on shaft 25. Gear 40 includes a pair of cam detents 42 (FIG. 3) on the outer face thereof and which are engaged by a limit switch 44 (FIGS. 3 and 4) such that for each half revolution of shaft 25 (corresponding to one foot of line), switch 44 is actuated and, as explained below, is used to control a remote electrical counter which indicates the length of line payed out. The motor 32 receives electrical power from a conductor 46 which is coupled to the motor by means of a control circuit actuated by switch 48. Switch 48 is mounted on cover 31 positioned over the motor and attached to the mounting plate.

The motor 32 which is enclosed in a sealed housing together with a right angle drive, is reversible and can be the type employed for raising and lowering powered windows for automobiles. Switch 44 is a single-pole, double-throw switch of the type employed for controlling powered windows in an automobile. The gear ratio between gears 39 and 40 is approximately 1:2, although this ratio is not critical as long as the braking effect of the gear reduction is sufficient such that the reel is securely held in place when the motor is not actuated.

Figure 5:
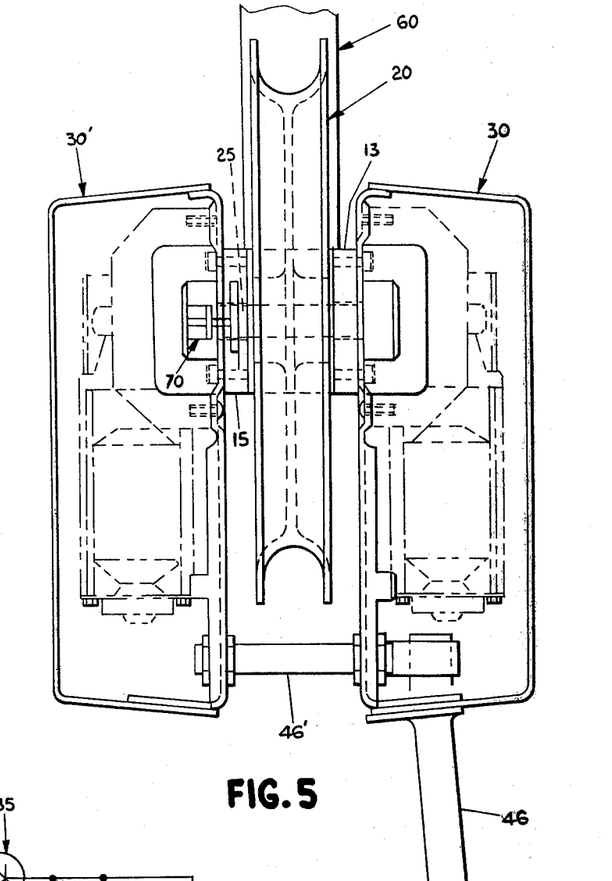
FIG. 5 is a plan view of an alternative embodiment of the present invention.

An alternative embodiment to that shown in FIGS. 1 through 4 is illustrated in FIG. 5 where, for very heavy duty use, it is desirable to provide a dual drive unit providing two identical reel drive units 30 and 30' mounted to opposite sides of the frame 12. In the embodiment shown in FIG. 5, the reel shaft 25 is also extended through the arm 15 of frame 12 such that it can be coupled to the shaft of the second drive motor in an identical coupling arrangement to that shown for motor 32 in FIGS. 2 through 4. A single control switch can be employed by coupling the reversible motors in parallel by means of an interconnecting conductor 46'. The counter 70 is positioned on the second drive unit 30' by means of a suitable mounting bracket. By so positioning the counter, it remains in an easily readable position adjacent the left side of the reel assembly.

Although the drive motor can, in some enbodiments, be directly controlled by means of the switch 48 which is a spring return switch continuously held in a raising or lowering position for paying out or retrieving the control line 50; it is desirable to provide an automatic retrieving control such that the reel will automatically retrieve the control line once a fish has struck the lure and the fising line is separated from the control line. Thus, while the fisherman is landing the fish, the control line will automatically be retrieved such that the fishing line can once again be coupled to the control line and the line lowered to the desired depth by means of switch 48. Such a control circuit is illustrated in FIG. 6.

Figure 6:
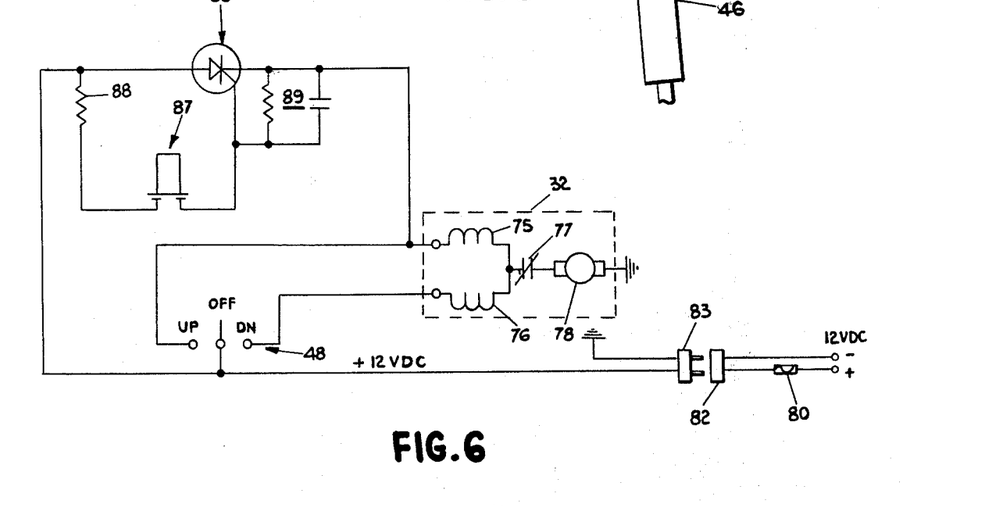
FIG. 6 is an electrical circuit diagram in schematic form of a control circuit which can be employed with the apparatus of the present invention.

In FIG. 6, the motor 32 is represented in schematic form and includes a raising winding 75 and lowering winding 76 interconnected at one end and having opposite ends coupled to the raising and lowering contacts of switch 48 as shown in the figure. In series with the windings 75 and 76 is an overload limit switch 77 which is normally closed but will open to deactivate the motor in the event that the control line on the reel has been fully retrieved such that the reel can no longer rotate. Motor 32 also includes a rotating armature 78 as shown in FIG. 6. Power is supplied to the control circuit by means of a 12 volt supply such as a storage battery, through a fuse 80 in the positive supply lead and an interconnecting jack 82 and plug 83. The negative supply lead is grounded to the frame of the reel assembly while the positive lead is coupled to the common switch terminal of switch 48 to be selectively coupled to raising or lowering windings 75, 76 to actuate the drive motor 32 to raise or lower (i.e., extend or retract) the control line 50.

To provide automatic retrieval of the control line, the positive lead from the power supply is coupled to the anode of an SCR 85 which has a cathode coupled directly to the raising winding 75 of the motor. The SCR 85 is actuated by means of a push button switch 87 coupled to the gate of SCR 85 by means of a current limiting resistor 88 which is serially coupled between the switch and the positive supply line. When push button switch 87 is momentarily actuated, the SCR 85 is latched on to provide a continuous conduction path from the 12 volt supply line to the raising winding 75 thereby causing the reel to be rotated in a direction to raise the control line without requiring the actuation of switch 48.

Once the line has been fully retrieved, the overload limit switch 77 will open to deactivate motor 32 and interrupt the current path for SCR 85 to turn the SCR off. Switch 87 is a spring-loaded push button switch which need only be momentarily actuated to fire the SCR. The parallel resistive-capacitive network 89 coupled from the gate to the cathode of the SCR protects the SCR from inductive voltage spikes by dissipating the energy therefrom. Although the current overload switch 77 is employed to turn SCR 85 off, other switching means such as a switch suitably coupled to the counter 70 can be employed to interrupt the current path for SCR 85 when the counter returns to the zero position. Other switching means such as a switch actuated by the deflection of flexible arm 60 (FIG. 1) once the line has been fully retrieved, can be employed to deactivate SCR 85 and thereby turn off the motor 32 once the line has been fully retrieved.

In addition to providing automatic retrieval of the control line once the fishing line has been separated therefrom, it is sometimes desirable to be capable of remotely controlling the trolling reel from the pilot house or other remote location of the boat. It is also desirable to provide an indication of the length of control line payed out at the same remote location. A control circuit for providing such remote control and indication is shown in FIG. 7.

Figure 7:
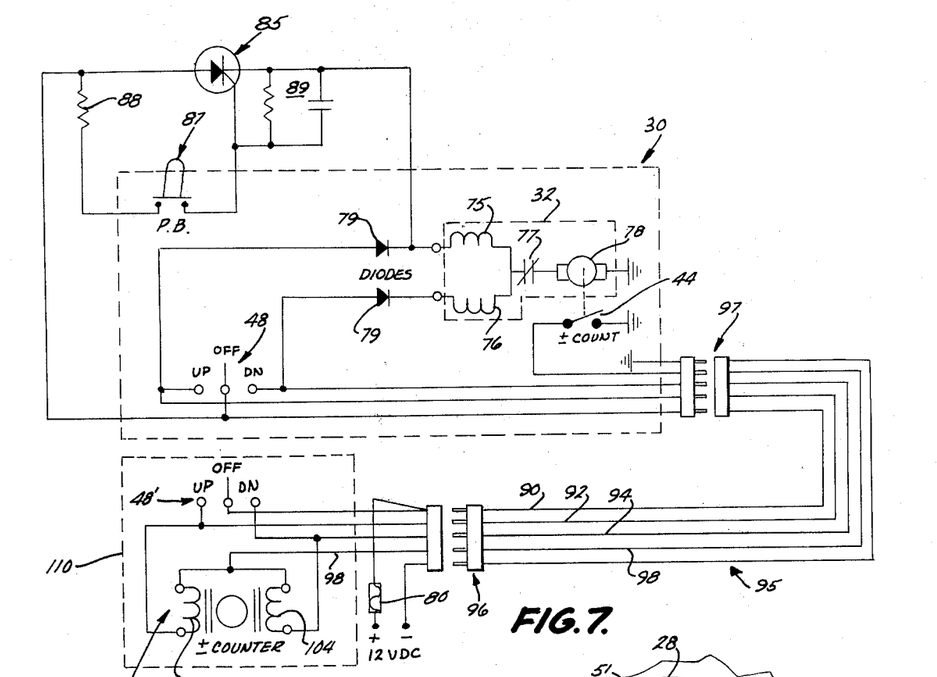
FIG. 7 is an electrical circuit diagram in schematic form of a remote control circuit and indicating means for the apparatus of the present invention.

In FIG. 7, components identical to those in FIG. 6 are represented by the same reference character. In this circuit, the regular control switch 48 is provided at the reel frame assembly for directly controlling the line reel 20. In addition, a remote control panel 110 is located at a desired remote location and coupled to the trolling apparatus by a multiple-conductor interconnecting cable 95. Jack-plug pairs 96 and 97 are used to connect cable 95 to panel 110 and the reel drive unit 30. Panel 110 houses an identical switch 48' parallelly coupled to switch 48 by means of interconnecting leads 90, 92 and 94 of cable 95 which couple the common contact, the raising contact, and the lowering contact of switches 48 and 48', respectively. In the embodiment shown in FIG.

7, a pair of diodes 79 are serially coupled between the raising and lowering contacts of switches 48 and 48' and windings 75 and 76 of motor 32, as shown, to isolate an electrical counter 100 in the remote panel 110.

Counter 100 is a standard commercaily available counter having a positive count winding 102 and a negative count winding 104 for incrementing and decrementing the digital count indicated thereby. Switch 44, which is physically shown in FIGS. 3 and 4 and schematically shown in FIGS. 7, is momentarily actuated twice for each revolution of the gear 40 as described above. This switch provides a ground return path for windings 102 and 104 of counter 100 through interconnecting conductor 98 included in the remote cable 95. As either of switches 48 or 48' are actuated, they supply voltage to one of the windings 102 or 104 of counter 100 and motor windings 75 or 76; as line reel 20 rotates and switch 44 is momentarily actuated, the counter is incremented or decremented indicating the line payed out or retrieved. The circuit of FIG. 7, therefore, provides both the remote control of line reel 20 as well as a remote indication of the length of control line extended. The push button switch 87 for momentarily actuating SCR 85 to automatically retrieve the control line as discussed with reference to FIG. 6 above, can be positioned at the reel assembly as shown in FIG. 7 or, if desired, can be included in the remote control panel 110 by including in the remote cable 95, a pair of additional leads for interconnecting switch 87 with the SCR circuit.

Figures 8, 9, 10, 11:
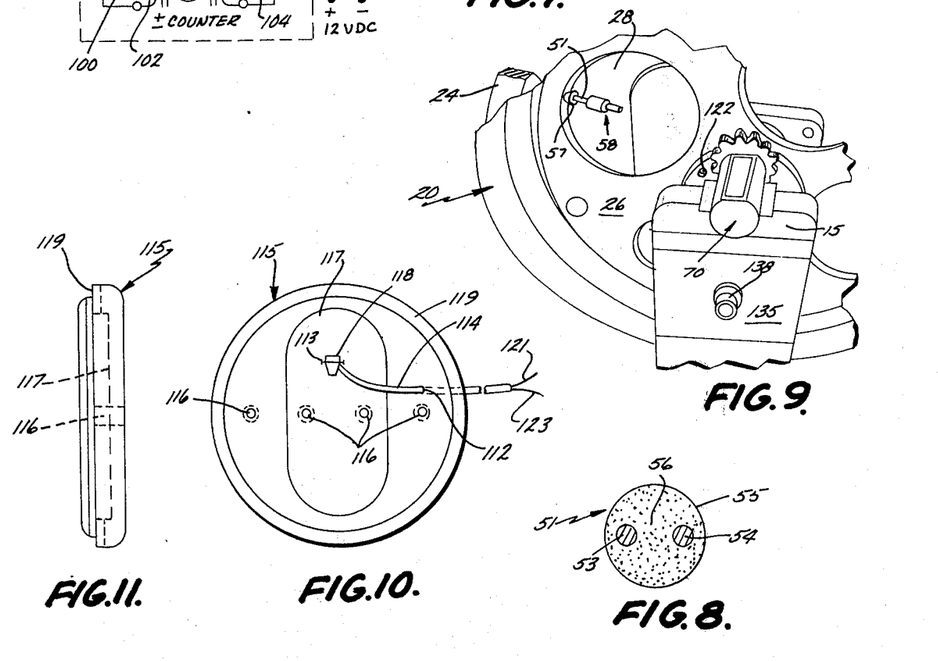
FIG. 8 is a cross-sectional view of an electrical conductor which can be employed as the control line for the trolling apparatus of the present invention.
FIG. 9 is an enlarged partial perspective view of a trolling reel which includes temperature sensing means.
FIG. 10 is a front elevation view of a reel plug used with the line reel shown in FIG. 9.
FIG. 11 is a side elevation of the mating plug for the plug shown in FIG. 10.

In addition to providing automatic retrieval and remote operation of the trolling apparatus, the control line of the trolling apparatus can be fabricated from an electrical conductor such as that shown in FIG. 8 to provide, in combination with the trolling apparatus, means for measuring the temperature of the water at which the control line is positioned. Turning now to FIG. 8, there is shown a cross-sectional view of a suitable electrical cable 51 which can be used as the control line for the trolling apparatus. Cable 51 includes a pair of electrical conductors 53 and 54 surrounded by strands of insulating material 56. Material 56 is structurally sufficiently strong to provide tensile strength for cable 51 which is adequate for the trolling apparatus. In one embodiment, fiberglass strands of material were employed. The electrical cable 51 surrounded by a suitable insulating jacket 55 which is waterproof and provides electrical insulation for the cable as well as seals the cable from water leakage.

As seen in FIG. 9, the electrical cable 51 extends through the end of reel channel 24 and is anchored at one end to the reel 20 at an edge of one of the apertures 28 by a crimping clip 57. An aperture is drilled through the channel and a portion of the reel web 26 to allow cable 51 to be so anchored. A two-prong electrical plug 58 is coupled to this end of the cable 51 to provide connecting means for electrically connecting the electrical cable to the temperature indicating means as described below. With such an arrangement, the electrical cable 51 (i.e., control line) can be easily replaced, if necessary, without disassemblying the entire reel frame assembly. It is noted here that the end of electrical cable 51 opposite 58 (i.e., the free end) has a temperature sensing device such as a thermistor mounted thereto as will be explained in greater detail with reference to FIGS. 17 through 20 below.

Electrical connection to the cable 51 is provided by means of a slip ring assembly 120, shown in FIGS. 12 through 15, which is coupled to the plug 58 by means of adapter plugs and an interconnecting cable 114 shown in FIGS. 10 and 11, now described.

The circular adapter plugs 115 (FIGS. 10 and 11) comprise a pair of identical circular discs of molded plastic material and having an oval central recess 117 in one side. A jack 118 adapted to receive plug 58 is secured to one of the plugs (FIG. 10) within recess 117 by a suitable bracket 113. Each adapter plug 115 includes a peripheral shoulder 119 which permits each of the plugs to be positioned and centered on opposite sides of the reel aperture 28. First, the adapter plug with jack 118 is fitted into aperture 28 and plug 58 is inserted into jack 118. Then the remaining plug 115 is snapped into the aperture 28 on the opposite side of reel 20 and the two adapter plugs 115 are securely fastened and sealed to each other by means of a plurality of screws inserted into the threaded apertures 116 of the plugs.

Figures 13, 14, 15:
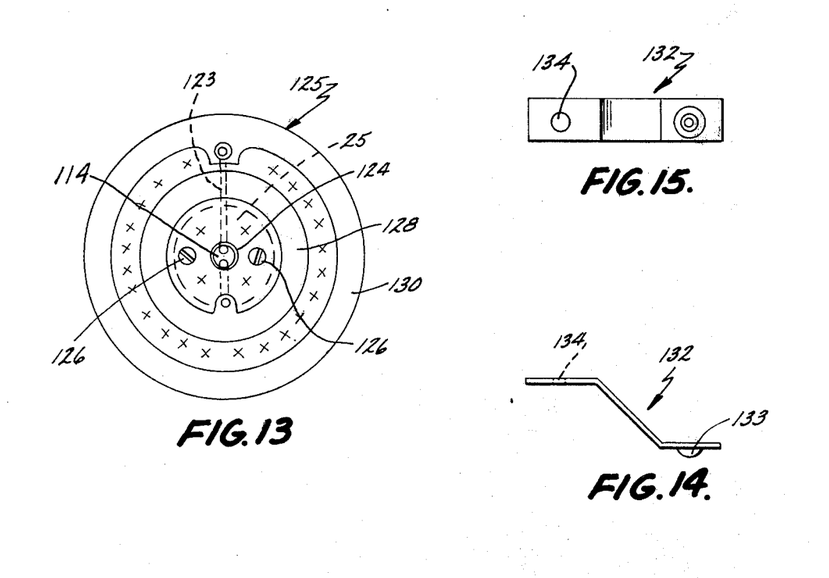
FIG. 13 is an enlarged front view of the slip rings shown pictorially in FIG. 12.
FIG. 14 is an enlarged side elevation of one of the contacts employed with the slip ring shown in FIG. 13.
FIG. 15 is an enlarged plan view of the contact shown in FIG. 14.

A two-conductor cable 114 extends from the two contacts of jack 118 and through an aperture 112 in the adapter plug adjacent the counter 70 (FIG. 9). This cable is then extended into an aperture 122 (FIG. 9) drilled in the shoulder 22 of disc 20 and which communicates with an aperture 124 drilled longitudinally through the center of shaft 25 as shown in FIG. 13. In this manner, therefore, the two electrical conductors 53 and 54 of the control cable 51 are brought out to one end of rotating shaft 25 and to the slip ring assembly 120.

Figure 12:
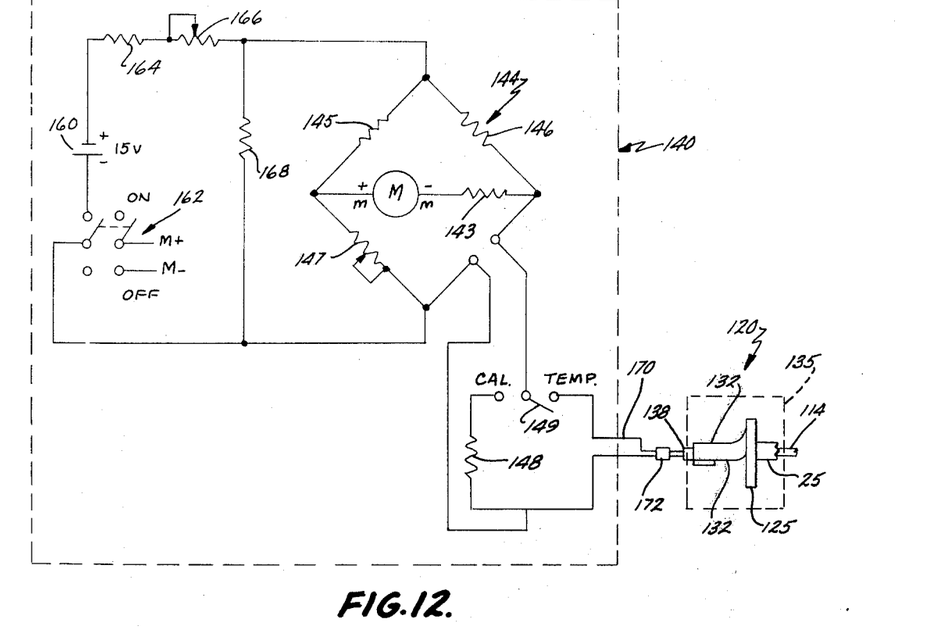
FIG. 12 is an electrical circuit diagram in schematic form of the control circuit for providing a remote indication of the temperature detected by the temperature sensing means of the present invention, and showing in pictorial form the interconnection of the sensing leads from the indicator to the line.

The slip ring assembly 120 shown schematically in FIG. 12 includes a circular disc 125 (FIGS. 12 and 13) of insulating material which is attached to the end of reel shaft 25 by means of a pair of bolts 126 threaded into the shaft such that disc 125 rotates with the rotation of shaft 25. Disc 125 includes an inner annular slip ring of conducting material 128 and an outer annular ring of conducting material 130 which is electrically insulated from ring 128. The slip rings so formed can be fabricated from a printed circuit board by etching away the shaded annular space between the inner and outer rings and around the central portion of the disc.

The two-conductor cable 114 extending from the end of shaft 25 has a first conductor 121 coupled to the inner slip ring 128 and a second conductor 123 coupled to the outer slip ring 130. To facilitate interconnection of the conductors to the rings, a pair of recesses are provided on the disc face opposite the rings and holes are drilled through disc 125 such that the conductors 121 and 122 can be soldered at one end to the rings and do not interfere with the wiper contacts which are coupled to the slip rings.

The slip ring assembly 120 further includes a pair of wiper contact arms 132, one of which is shown in FIGS. 14 and 15. The contact arms include a dimple contact 133 at one end and are generally Z-shaped with a mounting screw hole 134 at an opposite end thereof and are made of a suitable conductive and springable material such as beryllium copper. The contacts are fixedly positioned on an insulated housing 135 (FIGS. 9 and 12) such that one of the contacts 133 contacts the inner slip ring 128 while the remaining contact is electrically coupled to the outer slip ring 130. The contact arms are electrically coupled to the terminals of a jack 138 mounted on the outer wall of housing 135. In this manner, therefore, the electrical conductors 53 and 54 of the cable 51 are electrically coupled to a fixed jack 138 positioned in housing 135 mounted on the fixed support arm 15 of the reel assembly.

Housing 135 is sealed to prevent moisture and the like from interferring with the electrical contact between the contact arms and the slip rings. Adapter plugs 115 are likewise sealed to exclude moisture and dust from the plug and jack 58 and 118.

Figure 16:
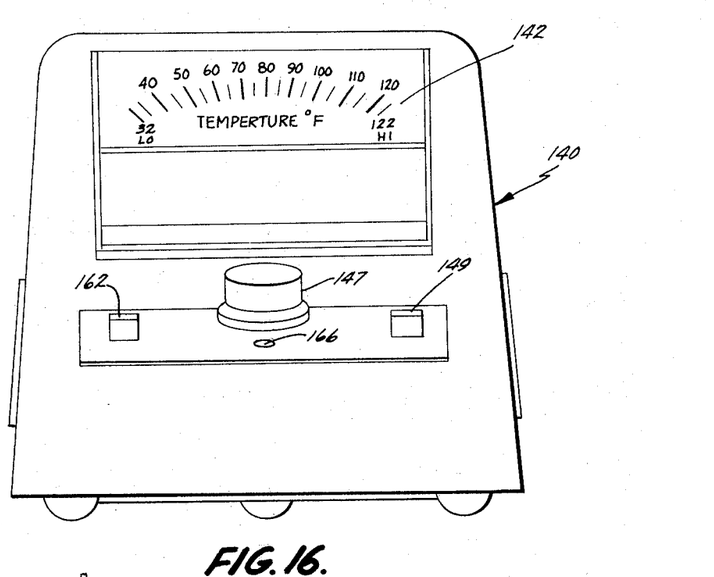
FIG. 16 is a front elevational view of the remote temperature indicator in which the control circuit is housed.

A remote temperature indicator unit 140 for use together with temperature sensing means is shown in FIG. 16 and the schematic circuit diagram therefor is shown in FIG. 12. The indicator unit 140 comprises an ammeter 142 calibrated in degrees Fahrenheit and coupled in a resistive bridge circuit 144. Bridge 144 includes fixed resistors 145 and 146 coupled in first and second legs, respectively, an adjustable resistor 147 positioned in the third leg, and a fixed calibration resistor 148 or a thermistor 150 (FIG. 19) coupled in the fourth leg, depending upon the position of the single-pole, double-throw switch 149. The meter includes a current limiting resistor 143 serially coupled therewith.

The junction of resistors 145 and 146 and the junction of resistor 147 with the calibration resistor 148 or thermistor 150, respectively, are coupled across a voltage source such as a battery 160 by means of an on-off switch 162, a fixed resistor 164, and a variable resistor 166. A shunting resistor 168 is also coupled between these junctions to damp meter 142. Coupled to the temperature indicating terminal of switch 149 and to the junction of resistors 147 and 148 is a two-conductor lead 170 having a plug 172 at the end which is adapted to fit within jack 138 on the slip ring housing 135 (FIG. 9). When so interconnected, and with the switch in the temperature indicating position, the thermistor 150 is coupled in the fourth leg of the bridge circuit 144 and depending upon the water temperature, its resistance varies to provide a current through meter 142 which then indicates the water temperature.

The indicator 140 is calibrated by first inserting the thermistor in ice water, which is generally available on a boat, and with switch 149 in the temperature reading position, by adjusting resistor 166 for zero meter current of a 32° F. reading. Next, switch 149 is positioned in the calibration position which inserts calibrating resistor 148 into the circuit and whose resistance is selected to correspond to the 120° F. reading on meter 142. Resistor 147 is adjusted for full scale deflection of the meter 142 which corresponds roughly to the 120° F. mark. Switch 149 is then positioned once again to the temperature reading position and the unit is ready for operation. As line 51 is lowered into the water, meter 142 will indicate the temperature of the water at which the thermistor 150 is located.

Figure 23:
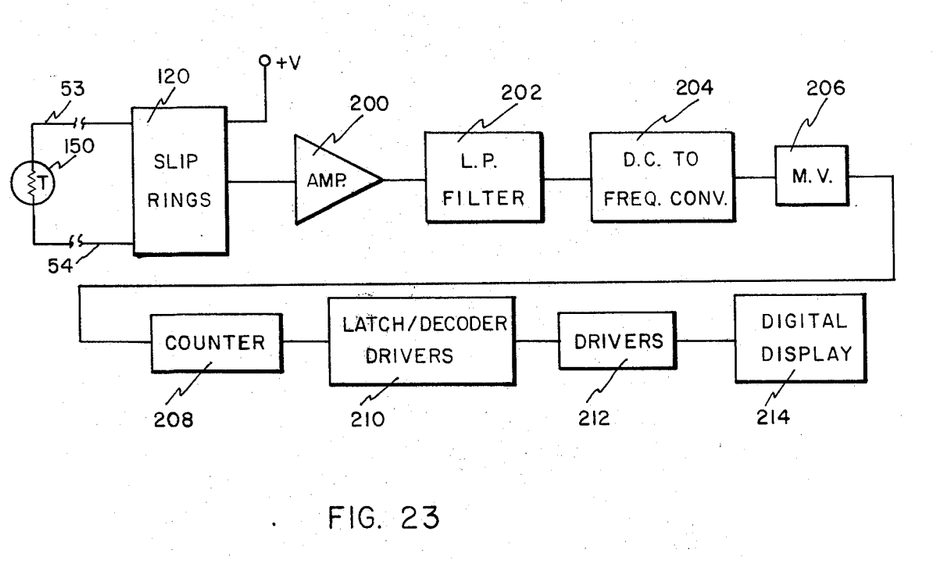
FIG. 23 is an electrical circuit diagram in block form of a digital temperature readout circuit for use as the remote temperature readout.

In place of the circuitry shown in FIG. 12 and the meter readout shown in FIG. 16, the system of the present invention can incorporate a digital display which is somewhat easier for the operator to read and provides precise temperature indication. The electrical circuitry for such a display is shown in FIG. 23 in which the thermistor 150 is coupled between a supply voltage +V in the figure and an input operational amplifier 200 by means of the conductors 53 and 54 of the control line 51 and the slip ring assembly 120 which can be identical to that shown in FIGS. 12–14.

The operational amplifier 200 amplifies the time varying DC signal from thermistor 150 and includes a gain potentiometer (not shown) for calibration of a thermistor at a reference temperature such as 32° F. The output amplifier 200 is coupled to the input of a low pass filter 202 which filters out any noise frequency or other higher frequency spurious signals while permitting the transmission of the temperature representative time varying DC signals to the input of a DC to frequency converter 204 coupled to the output of the low pass filter.

Circuit 204 includes an integrator and DC comparator which responds to the time varying DC signal to provide a saw-tooth output signal whose frequency is directly related to the voltage level of the input and therefore representative of the temperature sensed by thermistor 150. The saw-tooth signal is applied to a free running multi-vibrator circuit 206 which responds to the signals to generate a plurality of output pulses in response to the frequency varying input saw-tooth signals, the number of which are directly related to the temperature sensed by thermistor 150. Circuit 206 also includes a delay one shot multi-vibrator coupled to the free-running multi-vibrator and providing resent pulses to the subsequent counter circuit 208.

The counter 208 includes a dual binary coded decimal counter and a pair of BCD to 7 segment latch decoder driver circuits, all of which are commercially available integrated circuits coupled as a two stage (units and ten digits) BCD counter. The output of counter 208 is coupled to the input of a latch/decoder and driver circuit 210 which provides storage and decoding of the end count for driving the power drivers 212 which constitute fourteen high current transistors (seven for each of the two digits employed in the temperature display) having their output coupled to the display circuit 214. The display constitutes a seven element LED display commercially available providing a two digit readout of the temperature sensed by the thermistor 150.

Having described the electrical coupling of the cable 51 (employed as the control line for the temperature reading embodiment of the trolling apparatus) to the temperature indicating means, a description of the mounting of a thermistor on the free end of the control line to provide temperature sensing means is now presented.

Figure 17:
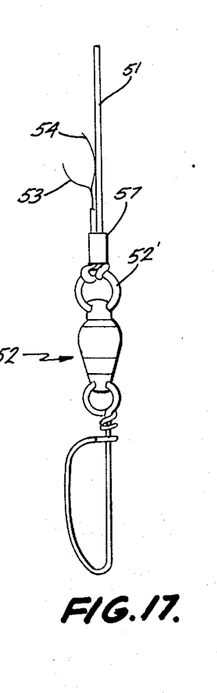
FIG. 17 is an enlarged front view of the end of the control line electrical conductor and its mechanical connection to a leader.

Referring now to FIGS. 17 through 20, there is shown the steps of manufacture of the end of electrical cable 51 and the sealed mounting of the thermistor 150 thereto. In FIG. 17, the cable 51 is passed through a ring 52' on clip 52 in a double half hitch. A crimping connector 57 secures the return end of the cable 51 to the lead end. The end of cable 51 is then stripped of insulation to bare conductors 53 and 54 thereof.

Figures 18, 19:
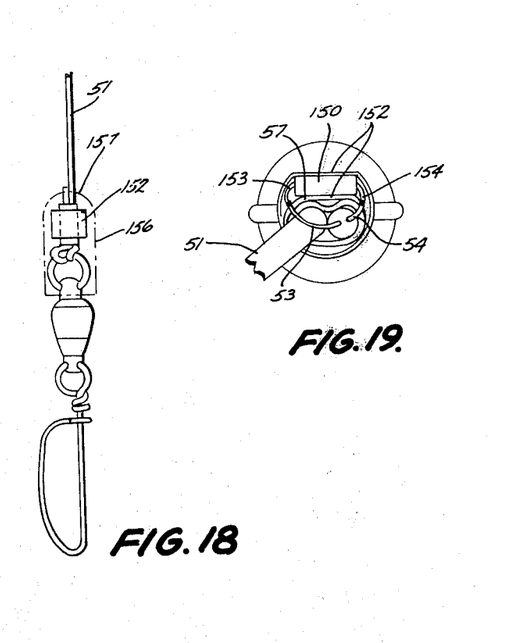
FIG. 18 is a front view of the end of the conductor during the second stage of manufacture after the mounting of a temperature sensing means thereon.
FIG. 19 is an enlarged plan view of the structure shown in FIG. 18.
Figure 20:
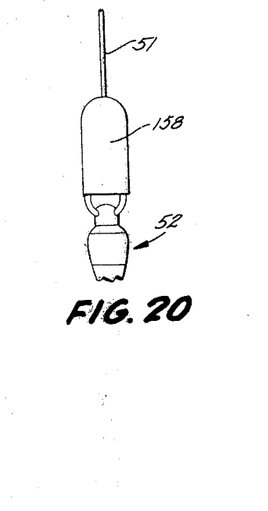
FIG. 20 is a partial front view of the end of the electrical conductor after the temperature sensing means has been coupled and sealed thereto.

Next, an insulating tape 152 of, for example, Mylar is wrapped around crimp connector 57 at least one time, and a thermistor 150 is positioned on the outer surface of the tape which is then wrapped around the thermistor at least once or twice to hold it in place. Thermistor leads 153 and 154 are then soldered to conductors 53 and 54 of cable 51, as shown in FIG. 19, to electrically couple the thermistor to the cable. A half of a gelatin capsule 156 which has an aperture 157 formed through the curved end and which has been positioned on the cable 51 above the connection, is slid down over the thermistor and taped into the position shown in FIG. 18. Finally, the capsule 156 is filled with a standard commercially available potting material 158 to form a mechanically rigid and waterproof seal for the thermistor as shown in FIG. 20. The capsule serves as a mold for the potting material and dissolves as the potting material cures. Material 158 seals the thermistor in position to the clip 52 and assures continuous electrical and mechanical connection of the thermistor to cable 51 and its mechanical connection to clip 52.

Figure 21:
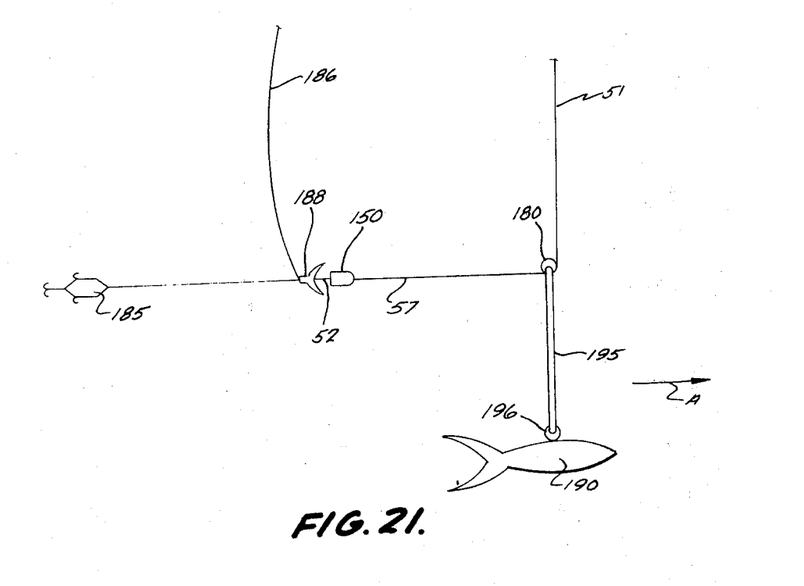
FIG. 21 is a side elevational pictorial view showing the suspension of the electrical conductor control line by means of a weight and angle forming means to provide suspension of the temperature sensing means proximity with a fishing lure.
Figure 22:
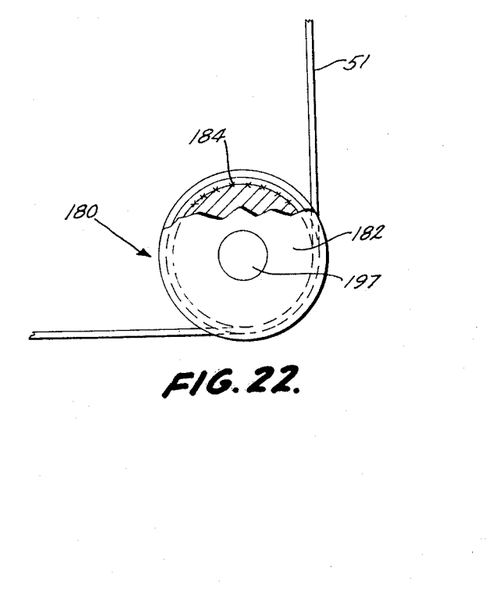
FIG. 22 is a partial perspective view partly in phantom form showing the angle forming means of FIG. 21 in detail.

In order to suspend the thermistor in proximity with the fishing lure, angle forming means 180 (FIGS. 21 and 22) is employed. As shown in FIGS. 21 and 22, electrical cable 51 having thermistor 150 encapsulated at the clip end, is suspended at an angle to the downward portion of the line and is adjacent a lure 185 attached to a fish line 186 which is releasably attached to clip 52 by means of a conventional releasing clip 188. Cable 51 extends around means 180 at an angle of approximately 90° from the downwardly suspended cable 51 and opposite the direction of motion of the boat (indicated by arrow A).

The angle forming means 180 comprises a spool 182 around which the electrical cable 51 is wound approximately 450° as seen in FIG. 22. Epoxy or other suitable bonding means 184 securely holds the electrical cable 51 to the spool 182 in this position. A weight 190 is suspended form the spool 182 by means of a flexible wire rope or a rubberized shock cord 195 by a pair of connectors 196 and 197 coupled to the weight and to the spool respectively. Connector 197 may be a hole drilled through the spool or may include eyebolts at opposite ends of spool 182 and a suitable yoke extending from the ends of the spool 182 to the flexible link 195 coupling the weight to the spool.

With this arrangement, it is seen that as the boat moves in the direction indicated by arrow A during trolling, the thermistor 150 will be positioned at approximately the same water depth as the lure 185 and provides a more accurate temperature indication than it would if it were conventionally mounted adjacent weight 190. Additionally, since the clip 188 can be positioned relatively closely to the lure 185, the thermistor will also be in lateral proximity to the lure and, therefore, provide a more accurate temperature indication. The flexible connecting link 195 allows the lure and the thermistor to remain relatively stable as the motion of the boat drags the weight 190 over an uneven lake bottom. If the weight becomes lodged temporarily or otherwise moves, such motion is largely absorbed by the flexible link 195 and not sharply transmitted to angle forming means 180 and, therefore, to lure 185. This helps to maintain the lure within a desired temperature strata. The angle forming means 180 can take a variety of forms and may comprise a form around which cable 51 is wound and molded into position after which the form can be removed. In such case, a suitable connector is provided for coupling the link 195 to the cable 51.

It will become apparent to those skilled in the art that various modifications to the embodiments of the present invention can be made. Such variations may include, for example, modifications to the power drive means for the trolling reel, variations of the electrical control circuitry, some of which have been indicated above; and modifications to the angle forming means and the weight attachment, as well as the coupling of the thermistor to the cable and clip. These and other modifications, however, will fall within the scope and spirit of the present invention as defined by the appended claims.

The embodiments of the invention in which an exclusive property or privilege is claimed are defined as follows:

1. A trolling apparatus adapted for mounting to a boat to pay out and retrieve a line in the water comprising:
   a reel frame;
   a line reel and a reel shaft coupled between said reel frame and said line reel for rotatably mounting said line reel to said reel frame, said line reel having a peripheral channel for holding a line therein;
   line guide means coupled at one end to said reel frame and extending therefrom;
   a line anchored at one end to said reel and guidably supported by said guide means as it is extended and retracted to and from said reel;
   drive means coupled to said line reel for extending and retracting said line from said line reel; a line comprising an electrical cable having a pair of conductors wherein one end of said line has temperature sensing means coupled thereto and the end of said line anchored to said reel is coupled to a slip ring assembly positioned on said reel frame to provide fixed electrical contacts communicating with said temperature sensing means wherein said slip ring assembly includes a disc of insulating material having a pair of spaced annular electrical contacts on one face thereof, said disc positioned on one end of said rotatable reel shaft and having said annular contacts coupled to said conductors of said electrical cable;
   a pair of fixed contact arms each positioned to continuously contact one of said annular contacts as said reel shaft rotates; and
   temperature indicating means coupled to said fixed contacts to provide a reading of the temperature of the sensing means.

2. The apparatus as defined in claim 1 wherein said reel shaft has a first aperture formed longitudinally extending therein and a peripheral aperture extending outwardly and communicating with said first aperture to permit the passage of an electrical cable from the periphery of said reel to said slip ring disc for providing electrical connection between said line cable anchored at the periphery of said reel and said slip ring disc.

3. The apparatus as defined in claim 2 wherein said temperature indicating means comprises a resistive bridge circuit having an ammeter calibrated in degrees, said temperature sensing means coupled to one leg of said bridge; said bridge circuit removably coupled to said trolling apparatus by means of a mating jack-plug pair wherein said plug is coupled to an electrical lead extending from said bridges and said jack is positioned on a housing surrounding said slip ring assembly and coupled to said fixed contact arms.

4. The apparatus as defined in claim 1 wherein:
   said line comprises an electrical cable having temperature sensing means coupled to one end thereof and temperature indicating means coupled to said line through a slip ring assembly on said reel frame;
   angle forming means spaced from said temperature sensing means to form a bend in said line; and
   means for attaching a weight to said angle forming means to suspend said line such that said temperature sensing means remains at approximately the same level in the water as the boat moves the line through the water while trolling.

5. The apparatus as defined in claim 4 wherein said attaching means is a flexible connector coupled at one end to said angle forming means and at an opposite end to a weight.

6. The apparatus as defined in claim 5 wherein said line includes a clip attached at said one end and wherein said temperature sensing means is secured and sealed to said clip and said line by a potting material.

7. The apparatus as defined in claim 1 wherein said temperature indicating means includes a digital display for providing a digital readout of temperature sensed by said temperature sensing means.

8. A combined trolling reel and water temperature reading apparatus to be mounted on a boat for suspending a fishing line therefrom at a desired water depth or temperature, said apparatus comprising:
   a trolling reel mounted on a shaft for holding and paying out or retrieving a control line to which a fishing line is releaseably attached;
   a reel frame rotatably holding said reel shaft;
   drive means coupled to said reel shaft for rotating said reel in first or second directions;
   indicating means coupled to said reel to indicate the length of control line payed out;
   a control line fabricated from a two-conductor electrical cable and anchored at one end to said reel;
   temperature sensing means coupled to the electrical conductors extending to the other end of said control line;
   a slip ring assembly including a pair of movable contacts comprising a pair of spaced rings of conductive material positioned on an insulated disc attached to one end of said reel shaft, means coupling said electrical conductors of said control line at said one end to said movable contacts, said slip ring assembly further including a pair of fixed contacts positioned to contact said movable contacts;
   temperature indicating means adapted to operate with said temperature sensing means; and
   means coupling said temperature indicating means to said temperature sensing means.

9. The apparatus as defined in claim 8 wherein said means coupling said movable contacts to said conductors at said one end of said control line comprises:
   an interconnecting electrical cable;
   means for removably connecting an end of said interconnecting cable to said one end of said control line;
   means providing at least a partly sealed channel for said interconnecting cable between said one end of said control line and said disc; and
   means coupling the other end of said interconnecting cable to said annular rings.

10. The apparatus as defined in claim 9 wherein said reel includes a central spindle, a peripheral channel, and a web supporting said channel to said spindle, said web including at least one aperture therethrough with a radial aperture communicating between said channel and said web to an edge of said aperture such that said control line can be extended into said web aperture through said radial aperture and anchored to said reel, and wherein said means providing a partly sealed channel comprises a pair of plugs fitted into said web aperture, and an aperture in said reel spindle communicating with a longitudinal aperture in said reel shaft to permit said interconnecting cable to extend from said one end of said control line to said one end of said reel shaft.

11. The apparatus as defined in claim 10 wherein said means for removably coupling said interconnecting cable to said one end of said control line comprises a mating jack-plug pair positioned on the mating ends of said cable and line, and wherein said plugs are adapted to cover and seal said jack-plug pair within said reel web.

12. The apparatus as defined in claim 8 wherein said temperature indicating means includes a digital display for providing a digital readout of temperature sensed by said temperature sensing means.

* * * * *

UNITED STATES PATENT AND TRADEMARK OFFICE
CERTIFICATE OF CORRECTION

PATENT NO. : 4,000,653

DATED : January 4, 1977

INVENTOR(S) : William M. Booth et al.

It is certified that error appears in the above-identified patent and that said Letters Patent are hereby corrected as shown below:

Column 1, line 45:
        After "to" insert -- a --.
    Column 1, line 48:
        "temperture" should be -- temperature --.
    Column 4, line 2:
        After "means" insert -- in --.
    Column 4, line 68:
        After "angle" insert -- drive --.
    Column 5, line 48:
        "enbodiments" should be -- embodiments --.
    Column 5, line 55:
        "fising" should be -- fishing --.
    Column 6, line 18:
        "buttom" should be -- button --.
    Column 6, line 22:
        "buttom" should be -- button --.
    Column 6, line 31:
        "buttom" should be -- button --.
    Column 7, line 6:
        "commercailly" should be -- commercially --.
    Column 7, line 11:
        "Figs." should be -- Fig. --.
    Column 7, line 48:
        After "51" should be -- is --.
    Column 7, line 65:
        After "opposite" should be -- plug --.
    Column 11, line 22:
        "form" should be -- from --.

UNITED STATES PATENT OFFICE
CERTIFICATE OF CORRECTION

Patent No. 4,000,653  Dated January 4, 1977

Inventor(s) William M. Booth et al.   Page 2 of 2

It is certified that error appears in the above-identified patent and that said Letters Patent are hereby corrected as shown below:

Column 13, line 16:

"releaseably" should be -- releasably --.

Signed and Sealed this

Seventeenth Day of May 1977

[SEAL]

Attest:

RUTH C. MASON
Attesting Officer

C. MARSHALL DANN
Commissioner of Patents and Trademarks